(12) United States Patent
Kawamura

(10) Patent No.: US 10,994,680 B2
(45) Date of Patent: May 4, 2021

(54) IMPACT-ABSORBING STRUCTURE FOR VEHICLE

(71) Applicant: MAZDA MOTOR CORPORATION, Hiroshima (JP)

(72) Inventor: Chikara Kawamura, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 120 days.

(21) Appl. No.: 16/344,883

(22) PCT Filed: Oct. 24, 2017

(86) PCT No.: PCT/JP2017/038391
§ 371 (c)(1),
(2) Date: Apr. 25, 2019

(87) PCT Pub. No.: WO2018/079562
PCT Pub. Date: May 3, 2018

(65) Prior Publication Data
US 2019/0270420 A1    Sep. 5, 2019

(30) Foreign Application Priority Data

Oct. 28, 2016 (JP) .............................. JP2016-211405

(51) Int. Cl.
*B60R 19/03* (2006.01)
*B60R 19/18* (2006.01)
(Continued)

(52) U.S. Cl.
CPC ............... *B60R 19/03* (2013.01); *B32B 5/26* (2013.01); *B60R 19/18* (2013.01); *B60R 19/34* (2013.01);
(Continued)

(58) Field of Classification Search
CPC ....... B32B 5/26; B32B 2605/00; B60R 19/18; B60R 19/34; B60R 19/03; F16F 7/00; F16F 7/12
(Continued)

(56) References Cited

U.S. PATENT DOCUMENTS

| 2010/0164238 A1* | 7/2010 | Nakanishi | B60R 19/34 |
| | | | 293/132 |
| 2015/0291114 A1* | 10/2015 | Borde | B60R 19/30 |
| | | | 293/122 |
| 2017/0320455 A1 | 11/2017 | Nakayama et al. | |

FOREIGN PATENT DOCUMENTS

| DE | 102013000459 B3 | 7/2014 | |
| DE | 102015215032 A1 * | 3/2016 | B60R 19/34 |

(Continued)

OTHER PUBLICATIONS

International Search Report issued in PCT/JP2017/038391; dated Jan. 9, 2018.
(Continued)

*Primary Examiner* — Joseph D. Pape
*Assistant Examiner* — Dana D Ivey
(74) *Attorney, Agent, or Firm* — Studebaker & Brackett PC

(57) ABSTRACT

Each impact-absorbing member has an open cross-sectional shape that is open to a first side of a vehicle width direction. Each impact-absorbing member includes an upper wall, a lower wall, a side wall extending between the upper wall and the lower wall, an upper flange portion extending upward from the upper wall, and a lower flange portion extending downward from the lower wall. Curved portions curved in the vehicle width direction in a protruding manner are formed in the side wall. The upper wall and the lower wall include a plurality of plate-shaped flat portions adjacent in the vehicle width direction, and step portions connecting the adjacent flat portions while forming a step in a vertical direction, respectively.

9 Claims, 10 Drawing Sheets

(51) Int. Cl.
  *B60R 19/34* (2006.01)
  *B32B 5/26* (2006.01)
  *F16F 7/12* (2006.01)
  *F16F 7/00* (2006.01)

(52) U.S. Cl.
  CPC .............. *F16F 7/00* (2013.01); *F16F 7/12* (2013.01); *B32B 2605/00* (2013.01)

(58) Field of Classification Search
  USPC .................................................. 293/133, 132
  See application file for complete search history.

(56) References Cited

FOREIGN PATENT DOCUMENTS

| DE | 102015215032 A1 | 3/2016 |
| JP | 2007-008283 A | 1/2007 |
| JP | 2016-097720 A | 5/2016 |
| JP | 2017-094849 A | 6/2017 |
| JP | 2017-094850 A | 6/2017 |
| JP | 2018-030466 A | 3/2018 |
| WO | 2010/100716 A1 | 9/2010 |
| WO | 2016/093073 A1 | 6/2016 |

OTHER PUBLICATIONS

An Office Action; "Notice of Reasons for Refusal," by the Japanese Patent Office dated Dec. 20, 2017, which corresponds to Japanese Patent Application No. 2016-211405 with English language Concise Explanation.

Extended European Search Report issued by the European Patent Office dated Sep. 23, 2019, which corresponds to EP17863937.3-1013 and is related to U.S. Appl. No. 16/344,883.

Communication pursuant to Article 94(3) EPC issued by the European Patent Office dated Nov. 5, 2020, which corresponds to European Patent Application No. 17863937.3-1009 and is related to U.S. Appl. No. 16/344,883.

* cited by examiner

IMPACT-ABSORBING STRUCTURE FOR VEHICLE

TECHNICAL FIELD

The present invention relates to an impact-absorbing structure for a vehicle including a bumper reinforcement extending in a vehicle width direction and one pair of impact-absorbing members.

BACKGROUND ART

Conventionally, a structure where one pair of front side frames or one pair of rear side frames installed in parallel in a vehicle width direction is provided in a front portion or rear portion of a vehicle body is known. Also, a structure where impact-absorbing members (so-called crash cans) that can absorb impact energy at a time of collision are provided at a tip of these side frames is known.

As the impact-absorbing member, a member formed of a metal material is mainly used. With this configuration, when vehicles collide, the impact-absorbing member absorbs impact energy by undergoing elastic-plastic deformation accompanied by buckling in an axial direction.

Here, with a view to weight reduction of the impact-absorbing member and eventually the vehicle body, it is also studied to form the impact-absorbing member with a fiber-reinforced plastic formed body. The fiber-reinforced plastic formed body is formed by using glass fiber, carbon fiber, metal fiber, or other fiber as a reinforcement and combining the reinforcement with a matrix. In particular, carbon fiber reinforced plastic (CFRP) has a characteristic having high specific strength (strength/specific gravity) and specific rigidity (rigidity/specific gravity), and having so-called lightness, strength, and rigidity. Therefore, using the carbon fiber reinforced plastic with such a characteristic as the impact-absorbing member makes it possible to achieve further weight reduction of the vehicle body while maintaining strength and rigidity.

For example, Patent Literature 1 discloses a structure including: one pair of load energy absorbing materials made of fiber-reinforced plastic (impact-absorbing members); and a bumper reinforcement attached to tips of these load energy absorbing materials and extending in a vehicle width direction. In this structure, a cross-sectional shape of each of the load energy absorbing materials includes a plurality of substantial U-shapes that is open to the vehicle width direction. Specifically, Patent Literature 1 discloses the load energy absorbing materials each including four flat plates extending in the vehicle width direction and three flat plates connecting the four flat plates in a vertical direction.

If the impact-absorbing member made of fiber-reinforced plastic is used as in Patent Literature 1, when an impact load is applied to a vehicle along a front and rear direction, destruction occurs continuously in the impact-absorbing member from a side to which the impact load is applied (forward or rearward) to the opposite side (rearward or forward) (so-called progressive destruction occurs in the impact-absorbing member). This will increase absorption efficiency of impact energy by the impact-absorbing member. Also, as in Patent Literature 1, if the load energy absorbing material (impact-absorbing member) is made of fiber-reinforced plastic and has an open cross-sectional shape that is open to the vehicle width direction and includes a plate-shaped member, manufacturing will be easy.

However, if the impact-absorbing member includes a member having an open cross-sectional shape and a plate shape in this way, the impact-absorbing member easily undergoes buckling. Occurrence of the buckling will obstruct the progressive destruction. Therefore, there is a possibility that impact energy may not be absorbed appropriately by the impact-absorbing member.

CITATION LIST

Patent Literature

Patent Literature 1: Japanese Patent Application Laid-Open No. 2007-008283

SUMMARY OF INVENTION

The present invention has been made in view of circumstances as described above, and an object of the present invention is to provide an impact-absorbing structure for a vehicle that can cause the impact-absorbing member to absorb higher impact energy at a time of vehicle collision.

The present invention is directed to an impact-absorbing structure for a vehicle, the impact-absorbing structure including: a bumper reinforcement extending in a vehicle width direction; and one pair of impact-absorbing members formed of a fiber-reinforced plastic including a plurality of reinforced fibers arranged to extend continuously in a front and rear direction, the one pair of impact-absorbing members extending from both ends of the vehicle width direction of the bumper reinforcement to one side of the front and rear direction, wherein each of the impact-absorbing members has an open cross-sectional shape that is open to a first side of the vehicle width direction, each of the impact-absorbing members including: an upper wall; a lower wall disposed below the upper wall to face the upper wall; a side wall extending in a vertical direction between edges of a second side of the vehicle width direction of each of the upper wall and the lower wall; an upper flange portion extending upward from an edge on the first side of the vehicle width direction of the upper wall; and a lower flange portion extending downward from an edge on the first side of the vehicle width direction of the lower wall, at least one curved portion that is curved to the vehicle width direction in a protruding manner is formed in the side wall, and each of the upper wall and the lower wall includes a plurality of plate-shaped flat portions adjacent to each other in the vehicle width direction, and a step portion connecting the adjacent flat portions while forming a step in the vertical direction.

The impact-absorbing structure for a vehicle of the present invention can cause the impact-absorbing member to absorb higher impact energy at a time of vehicle collision.

DESCRIPTION OF EMBODIMENTS (1) Structure of Rear Portion of Vehicle Body

An embodiment of the present invention will be described with reference to the drawings. The present embodiment will describe application of an impact-absorbing structure for a vehicle of the present invention to a rear portion of a vehicle body.

Figure 1:
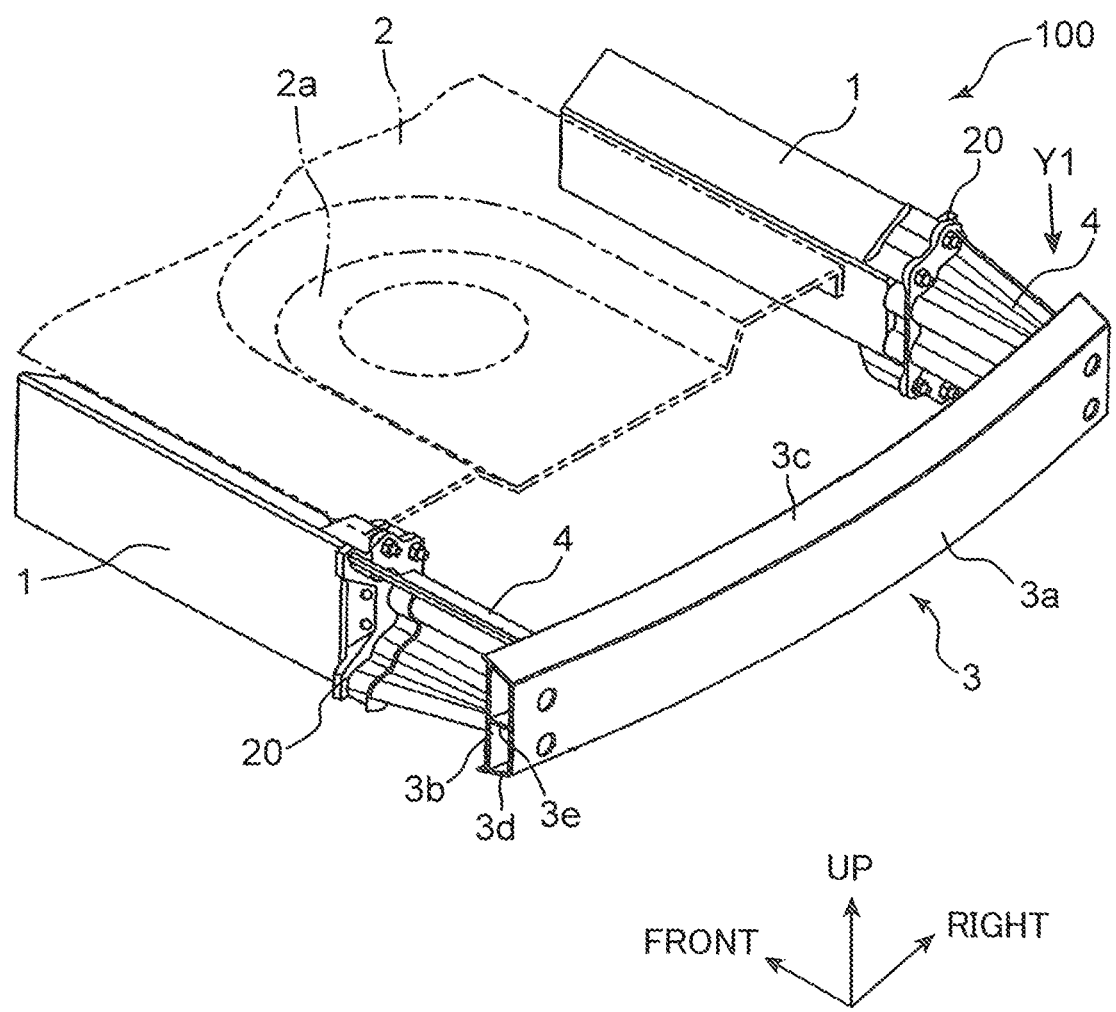
FIG. 1 is a schematic perspective view of a rear portion of a vehicle body having an impact-absorbing structure for a vehicle according to one embodiment of the present invention.

FIG. 1 is a schematic perspective view of a rear portion of a vehicle body having an impact-absorbing structure for a vehicle according to the present embodiment. In this specification, a front and rear direction refers to a front and rear direction of the vehicle body. Hereinafter, as appropriate, a vehicle width direction is referred to as a right and left direction, and right and left in a state of facing a front side of the vehicle body are referred to as right and left, respectively. Note that the description "(outside)" in the drawings shows the outside of the vehicle width direction.

As shown in FIG. 1, a vehicle 100 includes one pair of right and left rear side frames 1 extending in the front and rear direction, a floor panel 2 that is provided to extend between these one pair of rear side frames 1 and extends substantially along a horizontal plane, a bumper reinforcement 3 extending right and left, and one pair of right and left crash cans 4 (impact-absorbing members) that is disposed between the one pair of rear side frames 1 and the bumper reinforcement 3 and extends in the front and rear direction. An outer peripheral portion on a rear side of the bumper reinforcement 3 is covered with a bumper fascia (not shown).

Each rear side frame 1 is a member that supports the floor panel 2 and the like. Each rear side frame 1 has a substantially rectangular shape extending in the front and rear direction. A cross section orthogonal to the front and rear direction of each rear side frame 1 is a closed cross section. Each rear side frame 1 is formed as an integrated component, for example, through extrusion molding of an aluminum alloy material. In the present embodiment, as shown in FIG. 1, each rear side frame 1 has side surfaces extending substantially in parallel in the right and left direction. Each rear side frame 1 has a substantially trapezoid cross section with a size of a vertical direction of the inside surface of the vehicle width direction being shorter than a size of the vertical direction of the outside surface of the vehicle width direction.

The floor panel 2 is supported by the one pair of rear side frames 1 through welding joint of both right and left ends to the rear side frames 1. In a rear side portion of the floor panel 2, a spare tire pan 2a that is recessed downward and can store a spare tire (not shown) is formed.

Figure 2:
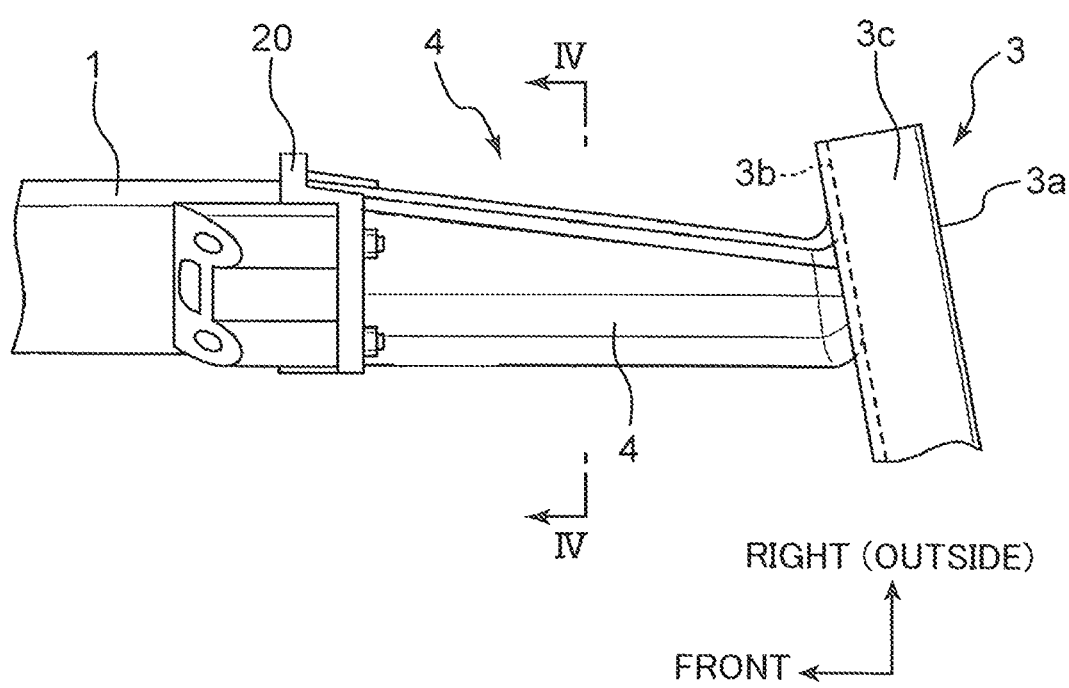
FIG. 2 is a plan view of a right portion of the rear portion of a vehicle body.

FIG. 2 is a plan view of a right portion of the rear portion of the vehicle body.

The bumper reinforcement 3 has a substantially rectangular shape extending in the right and left direction. A longitudinal cross section orthogonal to the front and rear direction of the bumper reinforcement 3 is substantially trapezoid-shaped. Specifically, the bumper reinforcement 3 includes a bumper rear wall 3a and a bumper front wall 3b that are arranged substantially in parallel with each other in the front and rear direction and each extend in the vertical direction, a bumper upper wall 3c extending between upper edges of the bumper rear wall 3a and the bumper front wall 3b, and a bumper lower wall 3d extending between lower edges of the bumper rear wall 3a and the bumper front wall 3b. An inside of the bumper reinforcement 3 is divided into two upper and lower closed cross sections. The bumper reinforcement 3 includes a node wall 3e that couples a substantially central portion of the vertical direction of the bumper rear wall 3a and a substantially central portion of the vertical direction of the bumper front wall 3b.

In the present embodiment, the bumper rear wall 3a and the bumper front wall 3b are curved to slightly bulge rearward. Meanwhile, the bumper upper wall 3c and the bumper lower wall 3d extend forward with respect to the bumper front wall 3b. The bumper reinforcement 3 is formed as an integrated component, for example, through extrusion molding of an aluminum alloy material.

(Crash Can)

Each crash can 4 is a member for absorbing impact energy at a time of rear collision of the vehicle. Each crash can 4 is a member formed of fiber-reinforced plastic. Furthermore, as will be described later, each crash can 4 is formed of a reinforced fiber lamination member obtained by laminating a plurality of fiber layers in which reinforcement fibers are arranged. The crash can 4 formed of fiber-reinforced plastic in this way is continuously destroyed from rear toward front when an impact load is applied from rear at a time of rear collision of the vehicle. That is, the crash can 4 is configured such that so-called progressive destruction occurs, and can absorb impact energy efficiently.

Figure 3:
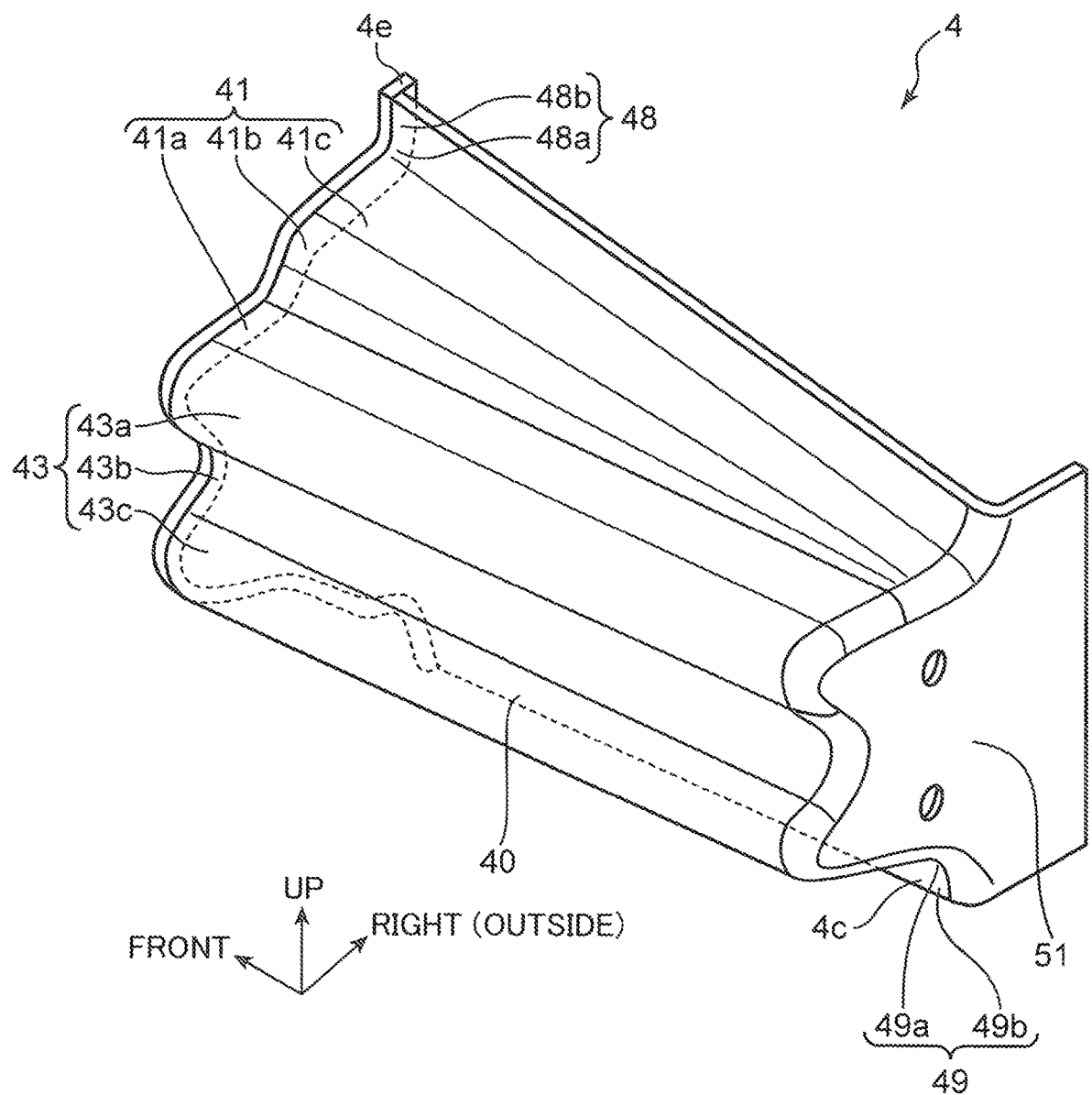
FIG. 3 is a view showing a crash can.
Figure 4:
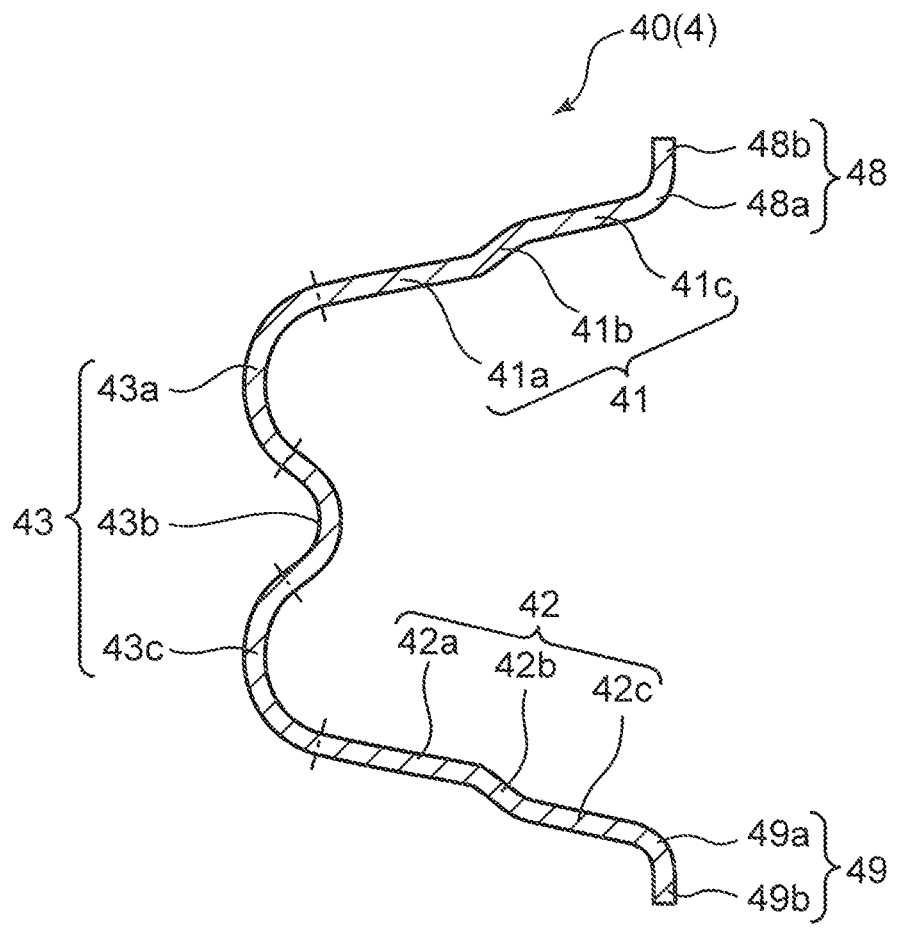
FIG. 4 is a cross-sectional view taken along line IV-IV of FIG. 2.
Figure 5:
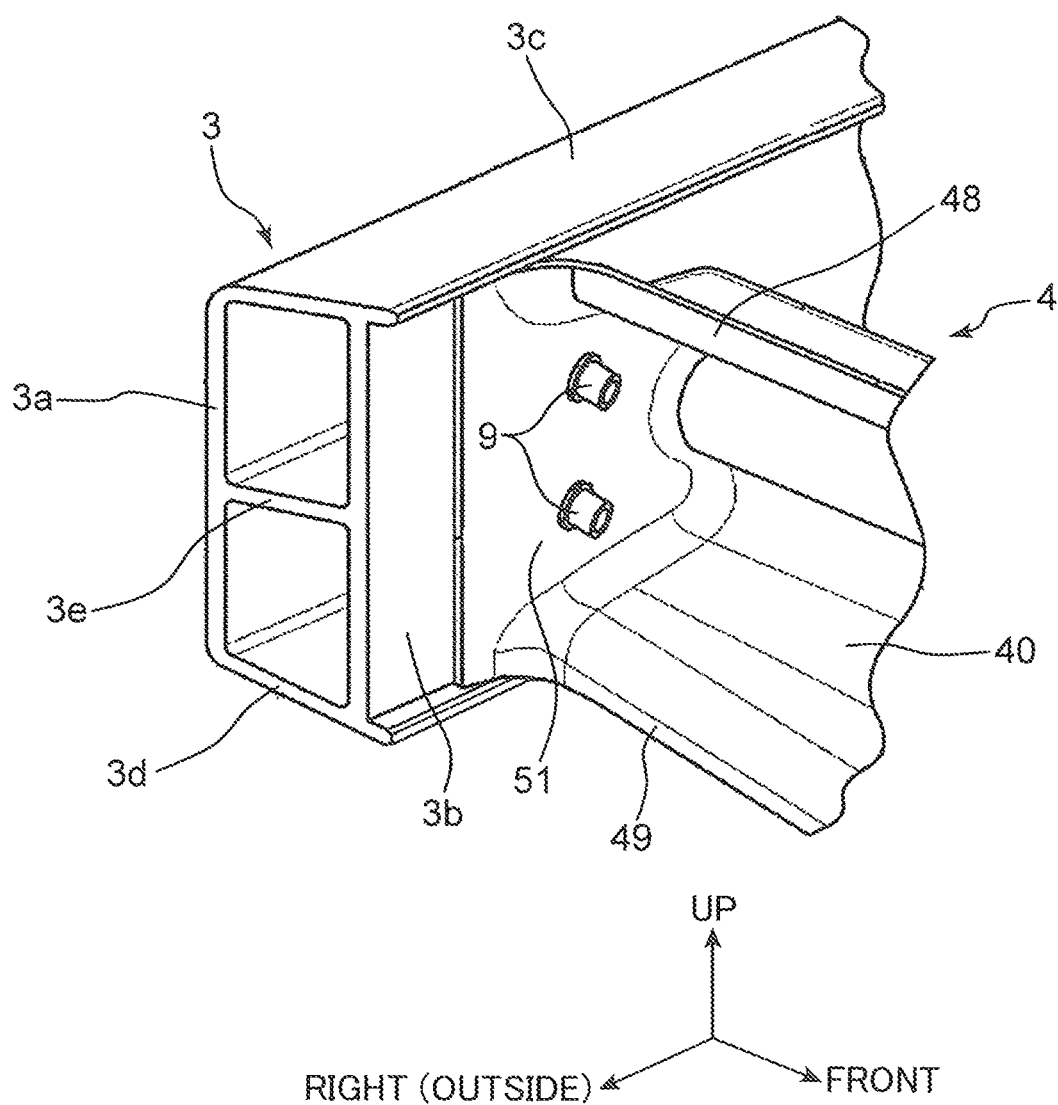
FIG. 5 is a partial enlarged view of a right end of the rear portion of a vehicle body viewed along arrow Y1 of FIG. 1.

One pair of crash cans 4 has symmetrical shapes with respect to the right and left direction. Hereinafter, the right crash can 4 will be described. FIG. 3 is a view taking out and showing the right crash can 4. FIG. 4 is a cross-sectional view taken along line IV-IV of FIG. 2. FIG. 5 is a partial enlarged view of a right end of the rear portion of the vehicle body viewed along arrow Y1 of FIG. 1.

As shown in FIG. 4 and other figures, the crash can 4 has an open cross-sectional shape that is open rightward (outward of the vehicle width direction).

As shown in FIG. 3 and other figures, the crash can 4 includes a body 40 having a shape that is open to the front and rear direction, a distal end wall 51 closing a rear end of the body 40, and a proximal end wall 4e protruding rightward from a front end of the body 40. The distal end wall 51 extends rightward with respect to the body 40.

As shown in FIG. 4, the body 40 of the crash can 4 has a substantially hat-shaped cross section. Specifically, the body 40 of the crash can 4 includes an upper wall 41 extending in the front and rear direction and the right and left direction, a lower wall 42 disposed below the upper wall to face the upper wall, and a side wall 43 extending in the vertical direction between left edges of the upper wall 41 and the lower wall 42. Also, the body 40 of the crash can 4 includes an upper flange portion 48 extending upward from a right edge of the upper wall 41, and a lower flange portion 49 extending downward from a right edge of the lower wall 42. In the present embodiment, the upper wall 41 is slightly inclined diagonally upward to the right as a whole, and the lower wall 42 is slightly inclined diagonally downward to the right as a whole.

The side wall 43 includes three curved portions 43a, 43b, and 43c. Specifically, the side wall 43 includes an upper curved portion 43a that constitutes an upper portion of the side wall 43 and is curved leftward in a protruding manner, a lower curved portion 43c that constitutes a lower portion of the side wall 43 and is curved leftward in a protruding manner, and an intermediate curved portion (inner curved portion) 43b that is interposed between the upper curved portion 43a and the lower curved portion 43c and is curved rightward in a protruding manner. The upper curved portion 43a and the lower curved portion 43c have symmetrical shapes with respect to the vertical direction.

The upper curved portion 43a bulges leftward such that a substantially central portion of the vertical direction is positioned on the leftmost side. That is, the upper curved portion 43a is curved to be positioned on the right side more as going upward and downward from the leftmost end portion that is positioned at the substantially center of the vertical direction. The upper curved portion 43a is curved to be substantially along an arc.

Similarly, the lower curved portion 43c is also curved such that a substantially central portion of the vertical direction is positioned on the leftmost side, and to be positioned on the right side more as going upward and downward from the leftmost end portion, and to be substantially along an arc.

The intermediate curved portion 43b is curved to be positioned on the right side more as going downward from a lower edge of the upper curved portion 43a, and then is curved to be positioned on the left side more as going downward. That is, the intermediate curved portion 43b bulges rightward such that a central portion of the vertical direction is positioned on the rightmost side. The intermediate curved portion 43b is also curved to be substantially along an arc.

The entire side wall 43 includes only curved portions. That is, a tangent of the intermediate curved portion 43b passing through an upper end of the intermediate curved portion 43b agrees with a tangent of the upper curved portion 43a passing through a lower end of the upper curved portion 43a. Also, a tangent of the intermediate curved portion 43b passing through a lower end of the intermediate curved portion 43b agrees with a tangent of the lower curved portion 43c passing through an upper end of the lower curved portion 43c.

In the example shown in FIG. 4, a size of the intermediate curved portion 43b in the vehicle width direction (amount of protrusion from one end to the other end in the vehicle width direction) and a size of the upper curved portion 43a and the lower curved portion 43c in the vehicle width direction (amount of protrusion from one end to the other end in the vehicle width direction) are set to be substantially the same.

The upper wall 41 includes two plate-shaped flat portions 41a and 41c adjacent to each other, and a step portion 41b connecting the flat portions 41a and 41c while forming a step in the vertical direction. Specifically, the upper wall 41 includes an upper first flat portion 41a extending straight and diagonally upward to the right from an upper edge of the side wall 43 (upper curved portion 43a), an upper second flat portion 41c extending straight and diagonally upward to the right at substantially the same inclination as the upper first flat portion 41a at a position above and to the right of the upper first flat portion 41a, and an upper step portion 41b connecting the upper first flat portion 41a and the upper second flat portion 41c. Almost the entire upper step portion 41b is curved. The upper step portion 41b is curved to bulge upward from a straight line connecting a right edge of the upper first flat portion 41a and a left edge of the upper second flat portion 41c.

The lower wall 42 and the upper wall 41 have symmetrical shapes with respect to the vertical direction. The lower wall 42 includes a plate-shaped lower first flat portion 42a extending straight and diagonally downward to the right from a lower edge of the side wall 43 (lower curved portion 43c), a lower step portion 42b that is curved to bulge downward, and a lower second flat portion 42c extending straight and diagonally downward to the right from a right edge of the lower step portion 42b.

The upper flange portion 48 extends upward while being curved from a right edge of the upper wall 41 (upper second flat portion 41c). An upper end portion of the upper flange portion 48 is plate-shaped. The upper flange portion 48 includes an upper flange curved portion 48a that is curved diagonally upward to the right from a right edge of the upper wall 41 to bulge diagonally downward to the right, and an upper flange flat portion 48b extending straight and upward from an upper end of the upper flange curved portion 48a.

The lower flange portion 49 and the upper flange portion 48 have symmetrical shapes with respect to the vertical direction. The lower flange portion 49 includes a lower flange curved portion 49a that is curved diagonally downward to the right from a right edge of the lower wall 42 (lower second flat portion 42c) to bulge diagonally upward to the right, and a lower flange flat portion 49b extending straight and downward from a lower end of the lower flange curved portion 49a.

As shown in FIGS. 2 and 3, the upper wall 41 as a whole is inclined to be positioned more upward as going forward. The lower wall 42 as a whole is inclined to be positioned more downward as going forward. Accordingly, a vertical size of the crash can 4 is larger as going forward. Also, as shown in FIG. 2 and other figures, the upper wall 41 and the lower wall 42 have shapes that expand more rightward (outward in the vehicle width direction) as going forward. Accordingly, the crash can 4 has a shape expanding more rightward as going forward.

The crash can 4 configured in this way is fixed to the bumper reinforcement 3. In detail, as shown in FIG. 5, the distal end wall 51 and the bumper front wall 3b of the bumper reinforcement 3 are fastened with bolts and nuts 9. In this fixed state, the distal end wall 51, the upper flange portion 48, and the lower flange portion 49 of the crash can 4 are disposed between the bumper upper wall 3c and the bumper lower wall 3d of the bumper reinforcement 3.

As shown in FIG. 1, the crash can 4 is also fixed to the rear side frame 1 via a mounting bracket 20. The mounting bracket 20 is fixed to the rear side frame 1 with the proximal end wall 4e of the crash can 4 being sandwiched.

(Lamination Structure)

Figure 6:
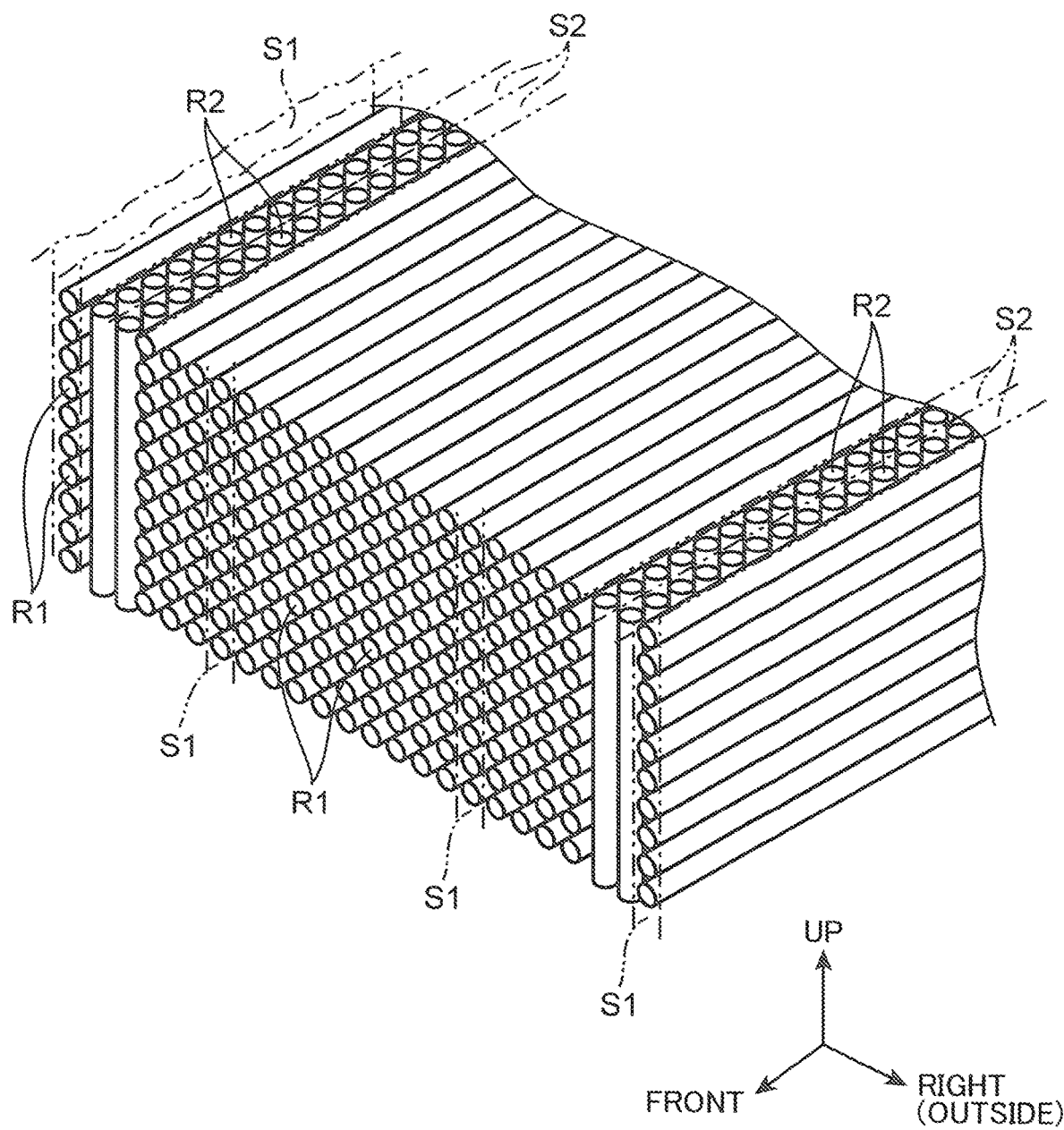
FIG. 6 is an enlarged view of part of FIG. 4.

FIG. 6 is an enlarged view of part of the crash can 4 (for example, part of the intermediate curved portion 43b). As shown in FIG. 6, and as described above, the crash can 4 is formed of the reinforced fiber lamination member, and is formed by laminating a plurality of fiber layers S1 and S2. In the present embodiment, carbon fiber is used as a reinforcement for the crash can 4. The crash can 4 includes the plurality of first fiber layers S1 in which carbon fibers are arranged to extend in the front and rear direction, and the plurality of second fiber layers S2 in which carbon fibers are arranged to extend in a direction orthogonal to the front and rear direction (vertical direction in the portion shown in FIG. 6).

The first fiber layers S1 include a plurality of fiber bundles (tows) R1 in which a some single fibers (filaments) uniformly extending in the front and rear direction are bundled. The first fiber layers S1 are formed by arranging the fiber bundles R1 in a direction orthogonal to the front and rear direction (vertical direction in FIG. 6). The second fiber layers S2 include a plurality of fiber bundles (tows) R2 in which a predetermined number of single fibers (filaments) uniformly extending in a direction orthogonal to the front and rear direction (vertical direction in FIG. 6) are bundled. The second fiber layers S2 are formed by arranging the fiber bundles R2 in the front and rear direction.

A diameter of the single fiber of the carbon fiber is, for example, 7 to 10 μm. Note that a thermosetting epoxy synthetic resin is used for a matrix of the crash can 4. In addition, illustration of the matrix is omitted in FIG. 6.

Most of the crash can 4 is formed of the first fiber layers S1. The second fiber layers S2 are disposed near the end of a plate thickness direction of the crash can 4 while being sandwiched between the first layers S1.

In the example shown in FIG. 6, one layer of the first fiber layers S1 is arranged at each of both ends of the plate thickness direction (right and left direction) of the body 40 of the crash can 4, two layers of the second fiber layers S2 are arranged between the first fiber layers S1, and a large number of, three or more, first fiber layers S1 are arranged between the second fiber layers S2.

Figure 7:
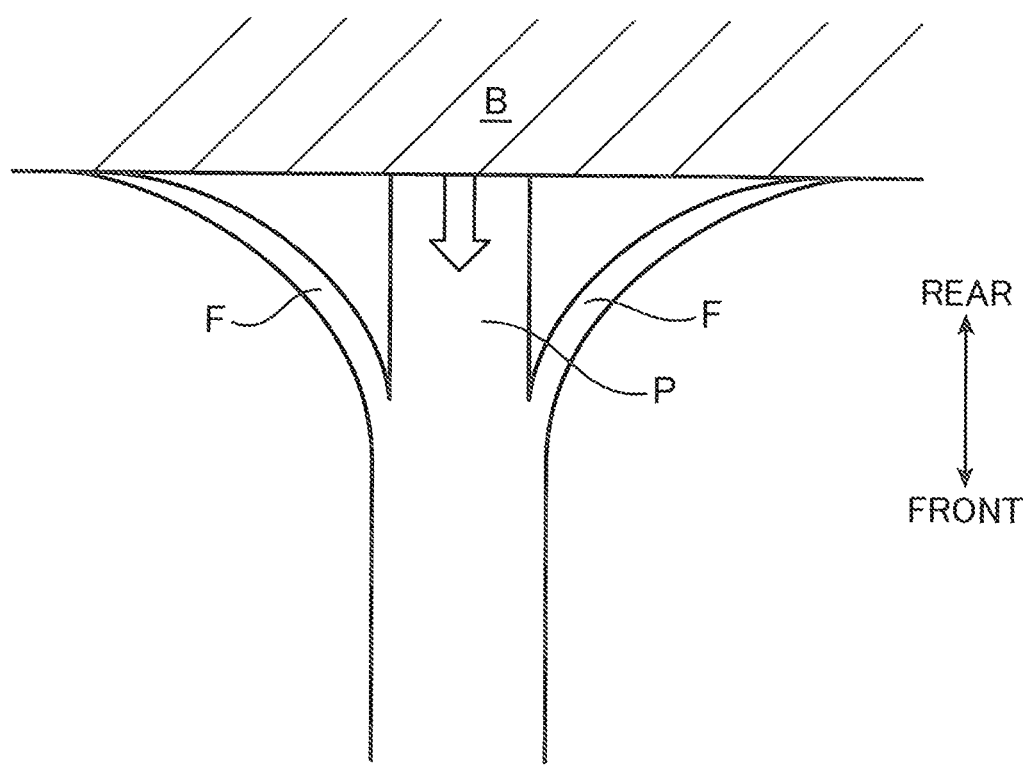
FIG. 7 is a schematic diagram showing destruction of fiber-reinforced plastic.

When a collision member B collides in the front and rear direction against the crash can 4 configured by laminating the fiber layers S1 and S2 as described above, the crash can 4 is progressively destroyed. FIG. 7 is a schematic diagram showing a pressurizing part B corresponding to the collision member B and a test piece having the lamination structure described above when the pressurizing part B is pressed against a test piece and the test piece is pressurized. As shown in FIG. 7, when a load is applied to the member having the lamination structure in the front and rear direction, in this member, a columnar portion (hereinafter referred to as a pillar portion) P to be compressed and destroyed, and a branch portion (hereinafter referred to as a frond portion) F that is peeled off from the pillar portion P at both end portions of the plate thickness direction of the member (right and left direction in FIG. 7) and is brought into contact with the collision member B in a substantially curved shape are formed.

Specifically, since the fibers are arranged to extend in a direction orthogonal to the front and rear direction, the second fiber layers S2 are lower than the first fiber layers 51 in strength against the compressive load in the front and rear direction. Therefore, when an impact load is applied to the crash can 4, the second fiber layers S2 are destroyed early. This promotes peeling off of the second fiber layers S2 and the first fiber layer 51 positioned outside of the second fiber layers S2 in the plate thickness direction (frond portion F) from the first fiber layers 51 (pillar portion P) positioned in an intermediate portion in the plate thickness direction. In other words, a starting point of peeling destruction, eventually progressive destruction is formed reliably. Therefore, it is possible to continuously generate peeling destruction of the frond portion F and compressed destruction of the pillar portion P, and to cause the crash can 4 to properly undergo progressive destruction. In addition, when a portion corresponding to the frond portion undergoes peeling destruction, the second fiber layers S2 form a fiber bridge between the plurality of first fiber layers 51. Therefore, it is possible to use cutting energy of the second fiber layers S2 to be cut by a tension load for energy absorption. Therefore, it is possible to cause the crash can 4 to effectively absorb impact energy.

Note that in the present embodiment, the crash can 4 is integrally formed by using a carbon fiber reinforced plastic (CFRP) formed body in which carbon fibers, long fibers, are used as a reinforcement, for example, by an RTM method. The RTM method is a molding method for setting a preform of carbon fiber in a cavity of a vertically separable forming die and injecting molten synthetic resin into the cavity.

(2) Plate Thickness and Plate Width of Plate Portion of Crash can

Next, a relationship between the plate thickness and plate width of plate-shaped portions of the crash can 4, that is, the upper first flat portion 41a, the upper second flat portion 41c, the lower first flat portion 42a, the lower second flat portion 42c, the upper flange flat portion 48b, and the lower flange flat portion 49b will be described.

As described above, the crash can 4 is configured to effectively absorb impact energy through progressive destruction at a time of vehicle collision. Therefore, to cause the crash can 4 to effectively absorb impact energy, it is necessary to appropriately transmit destruction to the front and rear direction. However, the inventors of the present invention have found out that when the crash can 4 is simply configured with plate-shaped members, it is difficult to appropriately transmit the destruction. Also, the inventors of the present invention have found out that this is caused by buckling occurring relatively early in plate-shaped portions.

Therefore, in the present embodiment, the plate thickness and the plate width of each of the plate-shaped flat portions 41a, 41c, 42a, 42c, 48b, and 49b are set such that a buckling load of each of the flat portions becomes larger than a progressive destruction load of each of the flat portions.

Specifically, the buckling load fcr of a plate-shaped member (member having a rectangular shape with a constant plate thickness) can be expressed by formula (4) below.

[Formula 4]

$$fcr = \frac{k\pi^2 E}{12(1-v^2)\left(\frac{b}{t}\right)^2} \quad (4)$$

In formula (4), variables are as follows. t: plate thickness of plate-shaped member (mm), b: plate width of plate-shaped member (corresponding to the length of each of the flat portions 41a, 41c, 42a, and 42c in the vehicle width direction, the length of each of the flat portions 48b and 49b in the vertical direction) (mm), E: Young's modulus (GPa) of the reinforced fiber lamination member in a longitudinal direction (corresponding to the front and rear direction of each of the flat portions 41a, 41c, 42a, 42c, 48b, and 49b), v: Poisson's ratio of the reinforced fiber lamination member, and k: restraining coefficient.

Meanwhile, the theoretical formula of the progressive destruction load of the plate member molded with fiber-reinforced plastic is not clearly understood. In contrast, the inventors of the present invention conducted a large number of experiments and have found out that the progressive destruction load of the plate member made of fiber-reinforced plastic, in particular, the plate member made of a reinforced fiber lamination member in which a plurality of fiber layers formed by arranging a plurality of reinforced fibers are laminated is proportional to compressive strength of the single reinforced fiber lamination member, and that the progressive destruction load is a value obtained by multiplying the compressive strength by a predetermined value A (progressive destruction load conversion factor). Furthermore, the inventors of the present invention have found out that the predetermined value A is about one fourth, in detail, a value within ±10% of one fourth, that is, a value that is 0.225 or more and 0.275 or less, and a value that is at least 0.225 or more.

Correspondingly, in the present embodiment, the plate thickness t (mm) of each of the flat portions 41a, 41c, 42a, 42c, 48b, and 49b is set to satisfy formula (5) below. Note that, for example, Young's modulus E (GPa) of carbon fiber reinforced plastic (CFRP) is 2 to 132.

[Formula 5]

$$t > \sqrt{A \times \frac{12(1-v^2)b^2\sigma_f}{k\pi^2 E}} \quad (5)$$

Parameters of this formula (5) are as follows. b: plate width of each of the flat portions 41a, 41c, 42a, 42c, 48b, and 49b (corresponding to a length b1 in the vehicle width direction of each of the flat portions 41a, 41c, 42a, and 42c, and a length b2 in the vertical direction of each of the flat portions 48b and 49b) (mm), k: restraining coefficient of each of the flat portions 41a, 41c, 42a, 42c, 48b, and 49b, a: compressive strength (GPa) of the reinforced fiber lamination member. A is the progressive destruction load conversion factor as described above, and is a constant that is set at a value of 0.225 or more and 0.275 or less.

Furthermore, the inventors of the present invention have found out that the plate member made of fiber-reinforced plastic has a Poisson's ratio v of about 0.3.

Here, when an end of the plate member in the plate width direction is connected to another member, 4.0 can be used as the restraining coefficient k. Both ends of the plate width direction (vehicle width direction) of the upper first flat portion 41a, the upper second flat portion 41c, the lower first flat portion 42a, and the lower second flat portion 42c are connected to the side wall 43, the step portions 41b and 42b, and the flange curved portions 48a and 49b. Therefore, 4.0 can be used as the restraining coefficient k (k1) of each of these portions 41a, 41c, 42a, and 42c.

Correspondingly, in the present embodiment, assuming that the predetermined value A is one fourth, the plate thickness t1 (mm) and the plate width b1 (mm) of each of the upper first flat portion 41a, the upper second flat portion 41c, the lower first flat portion 42a, and the lower second flat portion 42c are set to satisfy formula (2) below.

[Formula 2]

$$t1 > \sqrt{\frac{0.0688 \times b1^2 \sigma_f}{E}} \quad (2)$$

In the present embodiment, the plate widths of the upper first flat portion 41a, the upper second flat portion 41c, the lower first flat portion 42a, and the lower second flat portion 42c are set at substantially the same values. In the present embodiment, the plate thicknesses of the step portions 41b and 42b, the upper flange curved portion 48a, the lower flange curved portion 49a, and the side wall 43 are set at the same values as the plate thicknesses of the flat portions 41a, 41c, 42a, and 42c.

Also, if one end of the plate width direction of the plate member is open, 0.435 can be used as the restraining coefficient k. One end of each of the upper flange flat portion 48b and the lower flange flat portion 49b is open.

Correspondingly, in the present embodiment, the plate thickness t2 (mm) and the plate width b2 (mm) of each of the upper flange flat portion 48b and the lower flange flat portion 49b are set to satisfy formula (3) below.

[Formula 3]

$$t2 > \sqrt{\frac{0.06427 \times b2^2 \sigma_f}{E}} \quad (3)$$

Here, as described above, the plate width b (b1) of each of the upper first flat portion 41a, the upper second flat portion 41c, the lower first flat portion 42a, and the lower second flat portion 42c is required at least to satisfy formula (2). Meanwhile, since the crash can 4 is attached to the rear side frame 1, in order to appropriately transmit the load from the crash can 4 to the rear side frame 1, the size of the crash can 4 in the vehicle width direction is preferably less than or equal to the size of the rear side frame 1 in the vehicle width direction. Accordingly, in the present embodiment, the plate width b (b1) of each of the upper first flat portion 41a, the upper second flat portion 41c, the lower first flat portion 42a, and the lower second flat portion 42c is set at 100 mm or less.

(3) Effects and the Like

As described above, in the present embodiment, the crash can 4 has an open cross-sectional shape. Therefore, the crash can 4 can be formed relatively easily. Also, at a time of vehicle collision, it is possible to discharge the progressively destroyed fiber-reinforced plastic from the inside of the crash can 4 to the outside without accumulation inside the crash can 4. Therefore, it is possible to prevent the crash can 4 from being not crashed. Also, the crash of the crash can 4 can absorb more impact energy.

Moreover, since the curved portions 43a, 43b, and 43c which are curved in a protruding manner in the vehicle width direction are formed in the side wall 43 of the crash can 4, the buckling load of the side wall 43 is higher as compared to a case where the entire side wall 43 is made of a plate member. In particular, in the present embodiment, the buckling load is very high because the side wall 43 includes only the curved portions 43a, 43b, and 43c. Also, in the present embodiment, since the step portions 41b and 42b are formed in the upper wall 41 and the lower wall 42 of the crash can 4, respectively, the buckling load of the upper wall 41 and the lower wall 42 is higher as compared to a case where the upper wall 41 and the lower wall 42 each include a single plate member.

Therefore, while increasing the length of the vehicle width direction of the upper wall 41 and the lower wall 42 and eventually the cross sectional area of the crash can 4, and securing rigidity, the occurrence of buckling can be inhibited and the crash can 4 can be progressively destroyed appropriately. This enables the crash can 4 to absorb more impact energy.

Note that in order to more securely make the buckling load higher as compared to a case where the plate member is used, the curvature of each of the curved portions 43a, 43b and 43c is preferably 2000 or less. Also, the curvature, which is preferably small, is preferably 3 or more in manufacturing.

Also, in the present embodiment, the side wall 43 is provided with the intermediate curved portion 43b that is curved outward of the vehicle width direction in a protruding manner, that is, in a direction in which the crash can 4 is open. This allows the crash can 4 to inhibit the occurrence of deformation behavior in which a separation distance between the upper wall 41 and the lower wall 42, so-called reaming deformation of the opening increases.

This will more reliably implement appropriate progressive destruction of the crash can 4.

Also, in the present embodiment, the plate-shaped flat portions 41*a*, 41*c*, 42*a*, 42*c*, 48*b*, and 49*b* are set to satisfy formula (5). In particular, the upper first flat portion 41*a*, the upper second flat portion 41*c*, the lower first flat portion 42*a*, and the lower second flat portion 42*c* with both ends in the plate width direction being restrained are set to satisfy formula (2), and the upper flange curved portion 48*a* and the lower flange curved portion 49*a* with one end in the plate width direction being open are set to satisfy formula (3). Therefore, it is possible to make the buckling load of each of the flat portions 41*a*, 41*c*, 42*a*, 42*c*, 48*b*, and 49*b* larger than the progressive destruction load of each of the flat portions. This inhibits buckling from occurring in the flat portions 41*a*, 41*c*, 42*a*, 42*c*, 48*b* and 49*b* before progressive destruction occurs or during the progressive destruction. This will more reliably implement appropriate progressive destruction of the crash can 4.

Here, when each of the flat portions 41*a*, 41*c*, 42*a*, 42*c*, 48*b* and 49*b* is configured to satisfy formula (5) (formula (2) or formula (3)) as described above, it is possible to make the buckling load of the flat portions 41*a*, 41*c*, 42*a*, 42*c*, 48*b*, and 49*b* larger than the progressive destruction load of each of the flat portions.

Figure 8:
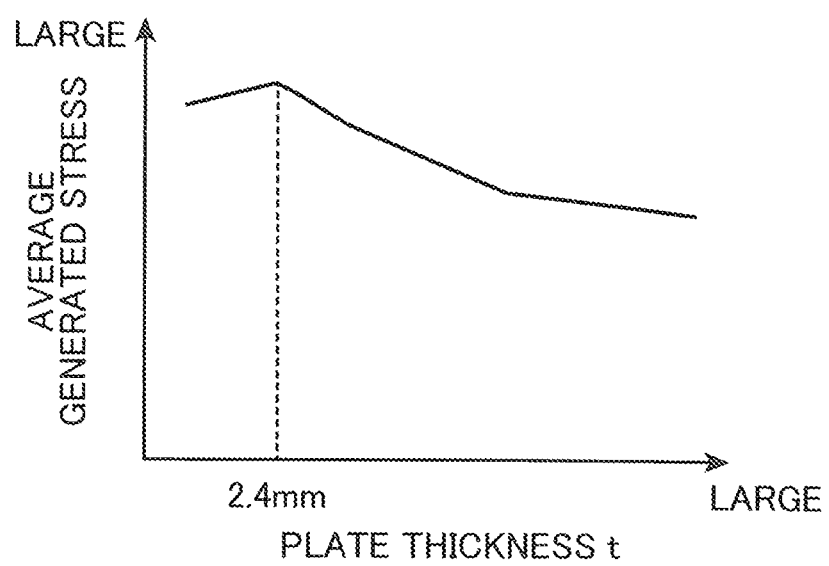
FIG. 8 is a graph showing a relationship between average generated stress and plate thickness.

However, in the crash can 4 made of fiber-reinforced plastic formed by laminating a plurality of fiber layers as in the present embodiment, a result of examining a relationship between the average generated stress when progressive destruction occurs and the plate thickness shows that, as shown in FIG. 8, when the plate thickness t becomes a predetermined value (reference value), the average generated stress becomes maximum, and the average generated stress decreases as the plate thickness t is away from this value. Note that the average generated stress is a value obtained by dividing the load applied to crash can 4 by the cross sectional area of a portion of the crash can 4 where no crack appears (for example, a portion about 5 to 30 mm away from an end on the side to which the load is applied). It is conceived that, when the plate thickness is excessively reduced, the average generated stress decreases because the thickness of the pillar portion decreases as the plate thickness decreases. That is, it is conceived that, when the thickness of the pillar portion decreases, the pillar portion buckles locally and the amount of fiber breakage per unit length of a stroke, that is, per unit length in the front and rear direction decreases, resulting in that the impact energy that can be absorbed by the crash can 4 decreases.

Therefore, it is preferable that the plate thickness of the crash can 4, at least the plate thickness of the upper wall 41, the lower wall 42, and the side wall 43 that mainly absorb the impact load are kept within a predetermined range.

For example, it is known that when the plate thickness is made smaller than 0.6 mm, sufficient pillar portion cannot be secured. Meanwhile, in a cylindrical member made of fiber-reinforced plastic formed by laminating a plurality of fiber layers, the reference value becomes a value of, for example, about 2.4 mm, and the plate thickness that can make the average generated stress a predetermined value or more is 6.0 mm or less. Therefore, when the crash can 4 is configured such that the plate thickness t of each of the flat portions 41*a*, 41*c*, 42*a*, 42*c*, 48*b*, and 49*b* is set at a value of 0.6 mm or more and 6.0 mm or less, or a value near 2.4 mm (for example, a value of 1.6 mm or more and 3.0 mm or less) and the plate width b satisfies formula (5), the impact energy that can be absorbed by the crash can 4 can be further increased.

Also, in the present embodiment, as described above, the upper flange portion 48 and the lower flange portion 49 of the crash can 4 are disposed between the bumper upper wall 3*c* and the bumper lower wall 3*d* of the bumper reinforcement 3. Therefore, the bumper upper wall 3*c* and the bumper lower wall 3*d* regulate upward and downward displacement of the upper flange portion 48 and the lower flange portion 49 of the crash can 4, respectively. This inhibits the crash can 4 from undergoing reaming deformation, and prevents unexpected buckling of the crash can 4 associated with the reaming deformation.

(4) Modification

Here, the above-described embodiment has described a case where the upper flange portion 48 and the lower flange portion 49 respectively include the curved portions (upper flange curved portion, lower flange curved portion) 48*a* and 49*a* and the flat portions (upper flange flat portion and lower flange flat portion) 48*b* and 49*b*. However, the flat portions 48*b* and 49*b* may be omitted and the upper flange portion 48 and the lower flange portion 49 may include only the curved portions 48*a* and 49*a*, respectively.

Also, the above-described embodiment has described a case where the step portions 41*b* and 42*b* have a curved shape, but the step portions 41*b* and 42*b* may have a linear shape (plate shape). However, if these step portions 41*b* and 42*b* are curved, buckling of the step portions 41*b* and 42*b* and the upper wall 41 and the lower wall 42 can be inhibited more reliably.

Also, the above-described embodiment has described a case where the size of the vehicle width direction of the intermediate curved portion 43*b* is about the same as the size of the vehicle width direction of the upper curved portion 43*a* and the lower curved portion 43*c*. However, these sizes may be different from each other. For example, the size of the vehicle width direction of the intermediate curved portion 43*b* (protrusion amount) may be set to be smaller than the size of the vehicle width direction of the other curved portions 43*a* and 43*b* (protrusion amount).

Also, the above-described embodiment has described a case where the three curved portions 43*a*, 43*b*, and 43*c* are formed in the side wall 43, but the number of curved portions is not limited to this number. For example, only one curved portion may be provided in the side wall 43, or five curved portions 143*a* to 143*e* may be formed in a side wall 143 as shown in FIG. 9.

Figure 10:
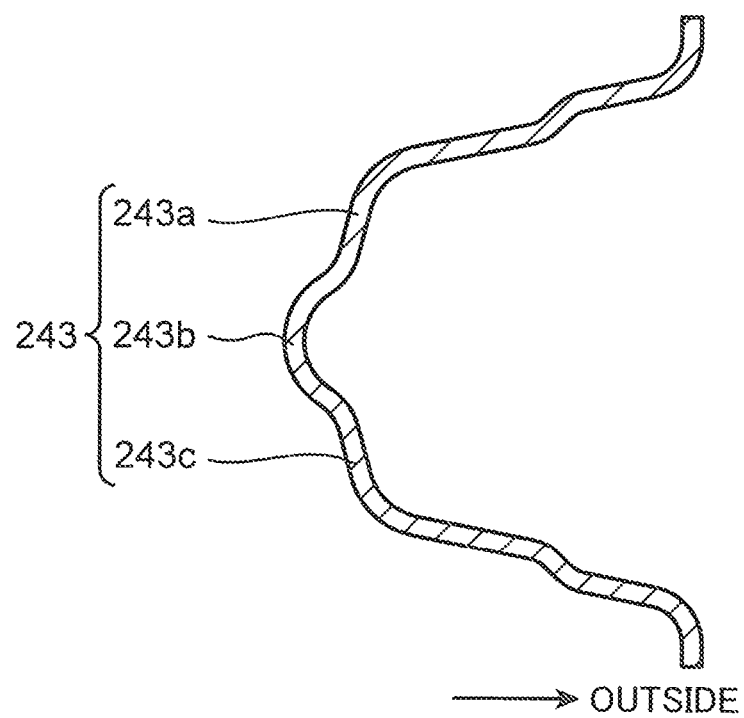
FIG. 10 is a view showing a cross section of a crash can according to another example.

Also, as shown in FIG. 10, a plurality of curved portions 243*a*, 243*b*, and 243*c* that are curved in a protruding manner on the same side of the vehicle width direction (inside of the vehicle width direction in the figure) may be formed in a side wall 243.

Figure 9:
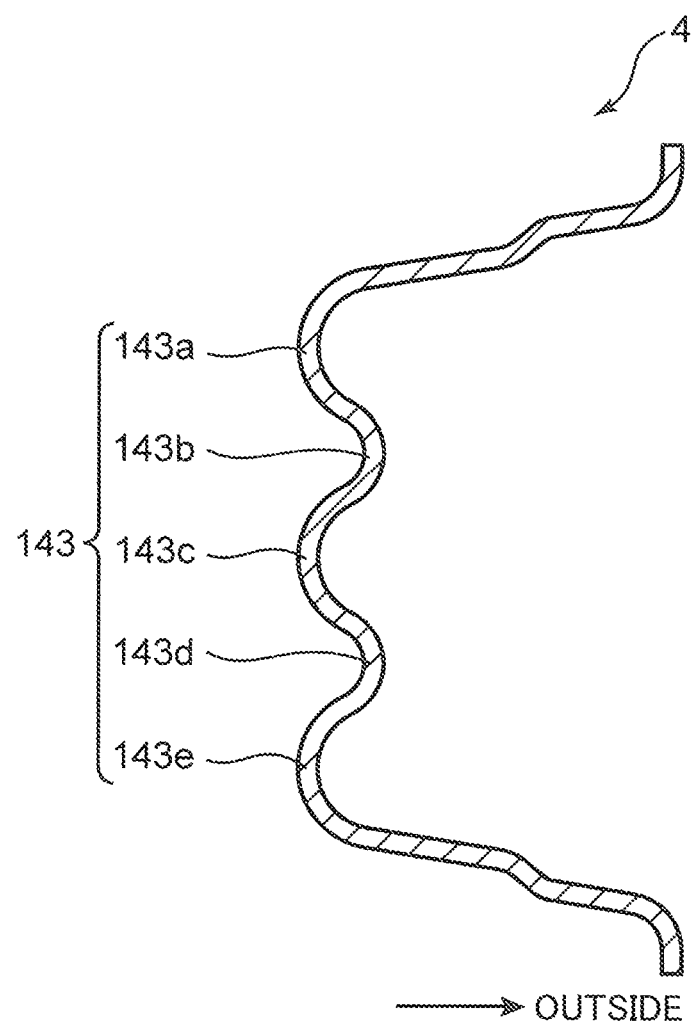
FIG. 9 is a view showing a cross section of a crash can according to another example.

However, as in the configuration shown in the above-described embodiment and FIG. 9, when the side wall 43 is provided with curved portions curved on the outside of the vehicle width direction in a protruding manner and curved portions curved on the inside of the vehicle width direction in a protruding manner, the curved portions curved on the inside of the vehicle width direction in a protruding manner (curved portions curved on the opposite side of an open side in a protruding manner) can increase the cross sectional area of the crash can 4 and increase the rigidity of the crash can 4, and the curved portions curved on the outside of the vehicle width direction in a protruding manner (curved portions curved on the open side in a protruding manner) can inhibit the reaming deformation of the crash can 4, as described above.

Also, the above-described embodiment has described a case where the above configuration is applied to the rear side crash can attached to the rear side frame 1, but the above configuration may be applied to a front side crash can attached to a front side frame.

Also, the above-described embodiment has described a case where the crash can 4 has an open cross-sectional shape that is open to the outside of the vehicle width direction, but the above configuration may be applied to a crash can having an open cross-sectional shape that is open to the inside of the vehicle width direction.

Also, the above-described embodiment has described a case where the crash can 4 is formed of carbon fiber reinforced plastic, but glass fiber, metal fiber, or the like may be used instead.

Also, matrix resin can be arbitrarily selected according to the specification of the crash can.

Also, the lamination structure of the fiber layers is not limited to the above structure. For example, the crash can 4 may be formed of orientation 0-degree fiber-reinforced plastic in which a plurality of orientation 0-degree fiber layers are arranged such that reinforcement fibers extend in the front and rear direction. Also, the crash can 4 may be formed of quasi-isotropic fiber-reinforced plastic in which an orientation 0-degree fiber layer, an orientation 45-degree fiber layer arranged such that fibers extend in a direction crossing at 45 degrees with respect to the front and rear direction, an orientation 90-degree fiber layer arranged such that fibers extend in a direction orthogonal to the front and rear direction, and an orientation –45-degree fiber layer arranged such that fibers extend in a direction crossing at –45 degrees with respect to the front and rear direction are sequentially laminated.

As described above, the inventors of the present invention made an earnest study and have found out that with the impact-absorbing member of the open cross-sectional shape, buckling occurs more easily as a plate-shaped portion becomes wider, in other words, a shape in which the plate-shaped portion is not continuous in a wide range is effective in avoiding a decrease in the buckling load.

The present invention has been made based on this knowledge, and the present invention is summarized as follows.

The present invention is directed to an impact-absorbing structure for a vehicle, the impact-absorbing structure including: a bumper reinforcement extending in a vehicle width direction; and one pair of impact-absorbing members formed of a fiber-reinforced plastic including a plurality of reinforced fibers arranged to extend continuously in a front and rear direction, the one pair of impact-absorbing members extending from both ends of the vehicle width direction of the bumper reinforcement to one side of the front and rear direction, wherein each of the impact-absorbing members has an open cross-sectional shape that is open to a first side of the vehicle width direction, each of the impact-absorbing members including: an upper wall; a lower wall disposed below the upper wall to face the upper wall; a side wall extending in a vertical direction between edges of a second side of the vehicle width direction of each of the upper wall and the lower wall; an upper flange portion extending upward from an edge on the first side of the vehicle width direction of the upper wall; and a lower flange portion extending downward from an edge on the first side of the vehicle width direction of the lower wall, at least one curved portion that is curved to the vehicle width direction in a protruding manner is formed in the side wall, and each of the upper wall and the lower wall includes a plurality of plate-shaped flat portions adjacent to each other in the vehicle width direction, and a step portion connecting the adjacent flat portions while forming a step in the vertical direction.

With this structure, since each impact-absorbing member has an open cross-sectional shape, the impact-absorbing member can be easily manufactured, and at a time of destruction of the impact-absorbing member, the reinforced fibers can be discharged out of the cross section, and it is possible to inhibit the destroyed reinforced fibers from obstructing destruction of the impact-absorbing member.

Moreover, since the curved portion curved in the vehicle width direction in a protruding manner is formed in the side wall of the impact-absorbing member, it is possible to make a buckling load of the side wall higher as compared to a case where the entire side wall has a plate shape. Also, since the step portion is formed in each of the upper wall and the lower wall of the impact-absorbing member, it is possible to make the buckling load of the walls higher as compared to a case where the upper wall and the lower wall each include one plate member. Therefore, it is possible to inhibit the occurrence of buckling in the impact-absorbing member, to progressively destroy the impact-absorbing member appropriately, and to absorb higher impact energy in the impact-absorbing member.

In the above-described configuration, preferably, each of the impact-absorbing members is formed of a reinforced fiber lamination member in which a plurality of fiber layers in which the plurality of reinforced fibers are arranged are laminated, and a plate thickness t1 (mm) of the flat portion of each of the upper wall and the lower wall is set to satisfy formula (1) below.

[Formula 1]

$$t1 > \sqrt{A \times \frac{12(1-v^2)b1^2 \sigma_f}{k1 \pi^2 E}} \quad (1)$$

In formula (1), variables are as follows. b1: length (mm) of the vehicle width direction of the flat portion of each of the upper wall and the lower wall, E: Young's modulus (GPa) of the reinforced fiber lamination member in a direction corresponding to the front and rear direction of the impact-absorbing member, v: Poisson's ratio of the reinforced fiber lamination member, k1: restraining coefficient of the flat portion of each of the upper wall and the lower wall, $\sigma_f$: compressive strength (GPa) of the reinforced fiber lamination member, and A: progressive destruction load conversion factor, a constant that is set at a value of 0.225 or more and 0.275 or less.

In this way, it is possible to more reliably inhibit the occurrence of buckling in the impact-absorbing member, to generate progressive destruction of the impact-absorbing member more appropriately, and to cause the impact-absorbing member to appropriately absorb impact energy.

Specifically, in the plate-shaped reinforced fiber lamination member extending in the front and rear direction, the buckling load fcr when a load is applied in the front and rear direction can be expressed by formula (4) below using parameters where t (mm) is the plate thickness, b (mm) is the plate width, and k is the restraining coefficient.

[Formula 4]

$$fcr = \frac{k\pi^2 E}{12(1-v^2)\left(\frac{b}{t}\right)^2} \quad (4)$$

In the plate member made of fiber-reinforced plastic formed by laminating fiber layers, it is known that the progressive destruction load, which is the load when progressive destruction occurs, corresponds to a value that is about one fourth of the compressive strength of the reinforced fiber alone, and 0.225 times or more and 0.275 times or less (at least 0.225 times or more). Therefore, when the plate thickness t1 of the flat portion of each of the upper wall and the lower wall is configured to satisfy above formula (1), the buckling load fcr of the flat portion can be made larger than the progressive destruction load, and the impact-absorbing member can be progressively destroyed before buckling occurs.

In the above-described configuration, preferably, the plate thickness t1 (mm) of the flat portion of each of the upper wall and the lower wall is set to satisfy formula (2) below.

[Formula 2]

$$t1 > \sqrt{\frac{0.0688 \times b1^2 \sigma_f}{E}} \quad (2)$$

Specifically, a value of about 0.3 can be used as the Poisson's ratio v of the plate member made of fiber-reinforced plastic formed by laminating fiber layers. Also, in this plate member, when the end in the width direction is connected to another member, 4.0 can be used as the restraining coefficient. Here, the end of the vehicle width direction of the flat portion of each of the upper wall and the lower wall is connected to another flat portion, flange portion, or side wall. Therefore, 4.0 can be used as the restraining coefficient k1 for these flat portions.

Therefore, by setting the flat portion of each of the upper wall and the lower wall to satisfy formula (2), which is obtained by simplifying formula (1) using the respective values, it is possible to inhibit buckling of the flat portion and generate progressive destruction of the flat portion appropriately.

In the above-described configuration, preferably, the upper flange portion includes a plate-shaped upper flange flat portion extending in the vertical direction from an upper end of the upper flange portion toward the upper wall, the lower flange portion includes a plate-shaped lower flange flat portion extending in the vertical direction from a lower end of the lower flange portion toward the lower wall, and a plate thickness t2 (mm) of each of the upper flange flat portion and the lower flange flat portion is set to satisfy formula (3) below.

[Formula 3]

$$t2 > \sqrt{\frac{0.06427 \times b2^2 \sigma_f}{E}} \quad (3)$$

In formula (3), b2 indicates a length (mm) of the vertical direction of each of the upper flange flat portion and the lower flange flat portion.

Specifically, when one end in the width direction of the plate member made of fiber-reinforced plastic formed by laminating fiber layers is open, 0.435 can be used as the restraining coefficient k (k1).

Therefore, in the configuration in which the upper flange portion includes a plate-shaped upper flange flat portion extending in the vertical direction from the upper end of the upper flange portion toward the upper wall, and the lower flange portion includes the plate-shaped lower flange flat portion extending in the vertical direction from the lower end of the lower flange portion toward the lower wall, when the upper flange flat portion and the lower flange flat portion with one end of the width direction being open are set to satisfy formula (3) obtained by simplifying formula (1) using the respective values, it is possible to inhibit buckling and generate progressive destruction appropriately.

Also, in the above-described configuration, preferably, the side wall includes two or more curved portions that are curved to the second side of the vehicle width direction in a protruding manner, and an inner curved portion that is interposed between the adjacent curved portions to be curved to the first side of the vehicle width direction in a protruding manner.

In this way, by configuring the side wall with a plurality of curved portions, it is possible to increase the buckling load of the side wall. Moreover, since the inner curved portion is provided, it is possible to inhibit the occurrence of deformation behavior, so-called reaming deformation of the opening, such that the separation distance between the upper wall and the lower wall increases when an impact load is applied to the impact-absorbing member. This will promote appropriate progressive destruction of the impact-absorbing member.

The invention claimed is:

1. An impact-absorbing structure for a vehicle, the impact-absorbing structure comprising: a bumper reinforcement extending in a vehicle width direction; and one pair of impact-absorbing members formed of a fiber-reinforced plastic including a plurality of reinforced fibers arranged to extend continuously in a front and rear direction, the one pair of impact-absorbing members extending from both ends of the vehicle width direction of the bumper reinforcement to one side of the front and rear direction, wherein
   each of the impact-absorbing members has an open cross-sectional shape that is open to a first side of the vehicle width direction, each of the impact-absorbing members including: an upper wall; a lower wall disposed below the upper wall to face the upper wall; a side wall extending in a vertical direction between edges of a second side of the vehicle width direction of each of the upper wall and the lower wall; an upper flange portion extending upward from an edge on the first side of the vehicle width direction of the upper wall; and a lower flange portion extending downward from an edge on the first side of the vehicle width direction of the lower wall,
   at least one curved portion that is curved to the vehicle width direction in a protruding manner is formed in the side wall, and
   each of the upper wall and the lower wall includes a plurality of plate-shaped flat portions adjacent to each other in the vehicle width direction, and a step portion connecting the adjacent flat portions while forming a step in the vertical direction, wherein each of the impact-absorbing members is formed of a reinforced fiber lamination member in which a plurality of fiber layers in which the plurality of reinforced fibers are arranged are laminated, and a plate thickness t1 (mm) of the flat portion of each of the upper wall and the lower wall is set to satisfy formula (1) below

[formula 1]

$$t1 > \sqrt{A \times \frac{12(1-v^2)b1^2\sigma_f}{k1\pi^2 E}} \quad (1)$$

where b1: length (mm) of the vehicle width direction of the flat portion of each of the upper wall and the lower wall, E: Young's modulus (GPa) of the reinforced fiber lamination member in a direction corresponding to the front and rear direction of the impact-absorbing member, v: Poisson's ratio of the reinforced fiber lamination member, k1: restraining coefficient of the flat portion of each of the upper wall and the lower wall, σf: compressive strength (GPa) of the reinforced fiber lamination member, and A: progressive destruction load conversion factor, a constant that is set at a value of 0.225 or more and 0.275 or less.

2. The impact-absorbing structure for a vehicle according to claim 1, wherein the plate thickness t1 (mm) of the flat portion of each of the upper wall and the lower wall is set to satisfy formula (2) below.

[Formula 2]

$$t1 > \sqrt{\frac{0.0688 \times b1^2 \sigma_f}{E}}. \quad (2)$$

3. The impact-absorbing structure for a vehicle according to claim 1, wherein the upper flange portion includes a plate-shaped upper flange flat portion extending in the vertical direction from an upper end of the upper flange portion toward the upper wall, the lower flange portion includes a plate-shaped lower flange flat portion extending in the vertical direction from a lower end of the lower flange portion toward the lower wall, and a plate thickness t2 (mm) of each of the upper flange flat portion and the lower flange flat portion is set to satisfy formula (3) below

[formula 3]

$$t2 > \sqrt{\frac{0.06427 \times b2^2 \sigma_f}{E}} \quad (3)$$

where b2: length (mm) of the vertical direction of each of the upper flange flat portion and the lower flange flat portion.

4. The impact-absorbing structure for a vehicle according to claim 1, wherein the side wall includes two or more curved portions that are curved to the second side of the vehicle width direction in a protruding manner, and an inner curved portion that is interposed between the adjacent curved portions to be curved to the first side of the vehicle width direction in a protruding manner.

5. An impact-absorbing structure for a vehicle, the impact-absorbing structure comprising: a bumper reinforcement extending in a vehicle width direction; and one pair of impact-absorbing members formed of a fiber-reinforced plastic including a plurality of reinforced fibers arranged to extend continuously in a front and rear direction, the one pair of impact-absorbing members extending from both ends of the vehicle width direction of the bumper reinforcement to one side of the front and rear direction, wherein each of the impact-absorbing members has an open cross-sectional shape that is open to a first side of the vehicle width direction, the open cross-sectional shape extending over the entire impact-absorbing member in the front and rear direction, each of the impact-absorbing members including:

an upper wall;

a lower wall disposed below the upper wall to face the upper wall;

a side wall extending in a vertical direction between edges of a second side of the vehicle width direction of each of the upper wall and the lower wall;

an upper flange portion extending, in a cross-section of the impact-absorbing member, upward from an edge on the first side of the vehicle width direction of the upper wall; and a lower flange portion extending, in the cross-section of the impact-absorbing member, downward from an edge on the first side of the vehicle width direction of the lower wall, at least one curved portion that, in the cross-section of the impact-absorbing member, is curved to the vehicle width direction in a protruding manner is formed in the side wall, and each of the upper wall and the lower wall includes a plurality of plate-shaped flat portions adjacent to each other in the vehicle width direction, and a step portion connecting the adjacent flat portions while forming a step in the vertical direction.

6. The impact-absorbing structure for a vehicle according to claim 5, wherein each of the impact-absorbing members is formed of a reinforced fiber lamination member in which a plurality of fiber layers in which the plurality of reinforced fibers are arranged are laminated, and a plate thickness t1 (mm) of the flat portion of each of the upper wall and the lower wall is set to satisfy formula (1) below

[formula 1]

$$t1 > \sqrt{A \times \frac{12(1-v^2)b1^2\sigma_f}{k1\pi^2 E}} \quad (1)$$

where b1: length (mm) of the vehicle width direction of the flat portion of each of the upper wall and the lower wall, E: Young's modulus (GPa) of the reinforced fiber lamination member in a direction corresponding to the front and rear direction of the impact-absorbing member, v: Poisson's ratio of the reinforced fiber lamination member, k1: restraining coefficient of the flat portion of each of the upper wall and the lower wall, σf: compressive strength (GPa) of the reinforced fiber lamination member, and A: progressive destruction load conversion factor, a constant that is set at a value of 0.225 or more and 0.275 or less.

7. The impact-absorbing structure for a vehicle according to claim 6, wherein
the plate thickness t1 (mm) of the flat portion of each of the upper wall and the lower wall is set to satisfy formula (2) below

[Formula 2]

$$t1 > \sqrt{\frac{0.0688 \times b1^2 \sigma_f}{E}}. \quad (2)$$

8. The impact-absorbing structure for a vehicle according to claim 6, wherein
the upper flange portion includes a plate-shaped upper flange flat portion extending in the vertical direction from an upper end of the upper flange portion toward the upper wall, the lower flange portion includes a plate-shaped lower flange flat portion extending in the vertical direction from a lower end of the lower flange portion toward the lower wall, and a plate thickness t2 (mm) of each of the upper flange flat portion and the lower flange flat portion is set to satisfy formula (3) below

[formula 3]

$$t2 > \sqrt{\frac{0.06427 \times b2^2 \sigma_f}{E}} \quad (3)$$

where b2: length (mm) of the vertical direction of each of the upper flange flat portion and the lower flange flat portion.

9. The impact-absorbing structure for a vehicle according to claim 5, wherein
the side wall includes two or more curved portions that are curved to the second side of the vehicle width direction in a protruding manner, and an inner curved portion that is interposed between the adjacent curved portions to be curved to the first side of the vehicle width direction in a protruding manner.

\* \* \* \* \*